(12) United States Patent
Ben Meir (10) Patent No.: US 9,376,157 B2
(45) Date of Patent: Jun. 28, 2016

(54) TRICYCLE WITH TWO RIDING MODES

(75) Inventor: Ilan Ben Meir, Hong Kong (CN)

(73) Assignee: Smart Trike MNF PTE LTD., Singapore (SG)

( * ) Notice: Subject to any disclaimer, the term of this patent is extended or adjusted under 35 U.S.C. 154(b) by 0 days.

(21) Appl. No.: 14/388,048

(22) PCT Filed: Jun. 29, 2012

(86) PCT No.: PCT/CN2012/077863
§ 371 (c)(1),
(2), (4) Date: Sep. 25, 2014

(87) PCT Pub. No.: WO2013/181871
PCT Pub. Date: Dec. 12, 2013

(65) Prior Publication Data
US 2015/0344092 A1     Dec. 3, 2015

(30) Foreign Application Priority Data
Jun. 4, 2012     (CN) .......................... 2012 1 0181112

(51) Int. Cl.
*B62K 5/02*     (2013.01)
*B62K 9/02*     (2006.01)
(Continued)

(52) U.S. Cl.
CPC ... *B62K 9/02* (2013.01); *B62K 5/05* (2013.01); *B62K 5/06* (2013.01); *B62K 5/08* (2013.01); *B62K 21/16* (2013.01)

(58) Field of Classification Search
CPC .............. B62K 9/02; B62K 5/05; B62K 4/06; B62K 5/08; B62K 21/16
USPC ......................................................... 280/263
See application file for complete search history.

(56) References Cited

U.S. PATENT DOCUMENTS 1,778,143 A     10/1930     Carlson
3,485,507 A  *  12/1969     Christof ................... A47D 1/06
                                                        280/202

(Continued)

FOREIGN PATENT DOCUMENTS

CN           1572644      2/2005
CN         201300934      9/2009

(Continued)

*Primary Examiner* — Anne Marie Boehler
*Assistant Examiner* — Marlon Arce
(74) *Attorney, Agent, or Firm* — Roach Brown McCarthy & Gruber, P.C.; Kevin D. McCarthy (57) ABSTRACT

The present invention discloses a tricycle having two riding modes, the tricycle comprising: a frame, a single-wheel assembly and a first handlebar mounting base that are disposed at one longitudinal end of the frame, a double-wheel assembly and a second handlebar mounting base that are disposed at the other longitudinal end of the frame, a transmission mechanism disposed between the second handlebar mounting base and the first handlebar mounting base, and a handlebar assembly selectively disposed on the first handlebar mounting base or the second handlebar mounting base, the single-wheel assembly comprising a steering wheel and a first pedal for driving the steering wheel to roll, the double-wheel assembly comprising two wheels widthwise spaced apart and a second pedal for driving the two wheels to roll. The tricycle has a first riding mode with single front wheel and double rear wheels and a second riding mode with double front wheels and single rear wheel. The tricycle of the present invention may easily switch between two riding modes and may increase the fun of riding.

6 Claims, 7 Drawing Sheets

(51) Int. Cl.
*B62K 5/05* (2013.01)
*B62K 5/08* (2006.01)
*B62K 5/06* (2006.01)
*B62K 21/16* (2006.01)

(56) References Cited

U.S. PATENT DOCUMENTS

| | | | | |
|---|---|---|---|---|
| 5,924,713 | A * | 7/1999 | Li | B62H 7/00 |
| | | | | 280/270 |
| 6,179,314 | B1 | 1/2001 | Jones | |
| 6,238,296 | B1 | 5/2001 | Mc Kinney, Jr. | |
| 6,612,598 | B2 * | 9/2003 | Wu | B62K 9/02 |
| | | | | 280/270 |
| 6,811,173 | B1 * | 11/2004 | Shih | B62H 7/00 |
| | | | | 280/270 |
| 6,966,572 | B2 | 11/2005 | Michelau | |
| 7,044,491 | B2 * | 5/2006 | Kettler | B62K 5/08 |
| | | | | 280/282 |
| 8,186,698 | B2 * | 5/2012 | Gunderson | B62K 5/02 |
| | | | | 280/210 |
| 8,262,114 | B2 * | 9/2012 | Jessie, Jr. | B62K 9/00 |
| | | | | 280/220 |
| 8,313,117 | B2 * | 11/2012 | Khare | B62J 17/08 |
| | | | | 280/263 |

FOREIGN PATENT DOCUMENTS

| | | |
|---|---|---|
| CN | 101830264 | 9/2010 |
| CN | 102076554 | 5/2011 |
| CN | 202180885 | 4/2012 |
| DE | 1910189 | 8/1970 |
| FR | 967722 | * 4/1950 |
| FR | 967722 | 11/1950 |
| GB | 1373313 | 11/1974 |
| GB | 2315250 | 1/1998 |
| JP | 2007-216868 | 8/2007 |
| KR | 20-2009-0011620 | 11/2009 |

* cited by examiner

TRICYCLE WITH TWO RIDING MODES

TECHNICAL FIELD

The invention relates to tricycles. More specifically, it relates to a tricycle with two riding modes, one mode being implemented with single front wheel and double rear wheels while the other mode being implemented with double front wheels and single rear wheel.

BACKGROUND ART

The normal riding mode of existing tricycles ridden by children is implemented with single front wheel and double rear wheels, where the single front wheel is a steering wheel which may be controlled via a handlebar to control steering. For sake of riding safety, the riding mode of some tricycles is implemented with double front wheels and single rear wheel. For example, the Chinese patent application CN 101830264A discloses a novel front-mounted type tricycle vehicle, including a novel front-mounted type motor tricycle, a novel front-mounted type electric tricycle, and a novel front-mounted type tricycle. The tricycle vehicle has the structure of two front wheels and one rear wheel. A front fork portion comprises a direction control lever, a left-and-right eccentric steering mechanism, a front fork fixing frame, a damping device, a left wheel and a right wheel. The direction control lever has a pivot point in its middle, and is coupled to the front fork fixing frame by a pivot shaft. The front fork fixing frame is coupled and integrated together with the ridge of the tricycle body. The rear wheel is disposed under the crossbar of the tricycle body. A front saddle and a back saddle are disposed above the rear wheel. For another example, the Chinese patent application CN 1572644A discloses a three-wheel rolling vehicle with a front two-wheel steering mechanism, the vehicle comprising a frame, a handlebar, a rear wheel rotating with respect to the frame, and a steering assembly which operates two front wheels. Two horizontal crossbars are disposed, and coupled to side tubes via hinges and coupled to the frame via additional hinges. The side tubes rotatably support steering tubes. All these existing tricycles have only one riding mode, either a mode of single front wheel and double rear wheels or a mode of double front wheels and single rear wheel. It is not possible to simultaneously have two riding modes implemented on the same tricycle, not to mention to switch between two riding modes. In other words, if riders are to enjoy the fun of two riding modes, they have to own two tricycles having different riding modes, which is not convenient for the riders.

SUMMARY OF THE INVENTION

The technical problem to be solved by the invention is to overcome the deficiencies existed in the prior art. The invention provides a tricycle, which may easily switch between two riding modes and may increase the fun of riding.

The present invention discloses a tricycle having two riding modes, the tricycle comprising: a frame, a single-wheel assembly and a first handlebar mounting base that are disposed at one end of the frame along its longitude, a double-wheel assembly and a second handlebar mounting base that are disposed at the other end of the frame along its longitude, a transmission mechanism disposed between the second handlebar mounting base and the first handlebar mounting base, and a handlebar assembly selectively disposed on the first handlebar mounting base or the second handlebar mounting base, the single-wheel assembly comprising a steering wheel and a first pedal for driving the steering wheel to roll, the double-wheel assembly comprising two wheels horizontally spaced apart and a second pedal for driving the two wheels to roll, the tricycle having a first riding mode with single front wheel and double rear wheels and a second riding mode with double front wheels and single rear wheel.

The tricycle further comprises a saddle, the frame having disposed thereon a first saddle mounting base and a second saddle mounting base, the saddle being disposed on the first saddle mounting base in the first riding mode, while the saddle being disposed on the second saddle mounting base in the second riding mode.

The first saddle mounting base is closer to the single-wheel assembly and the first handlebar mounting base compared with the second saddle mounting base.

The frame comprising at its end where the double-wheel assembly and the second handlebar mounting base are disposed: a longitudinal ridge which extends longitudinally and downwards at an angle of inclination and a mounting frame which extends from the end of the longitudinal ridge and downwards at an angle of inclination, the mounting frame being in the shape of "E" and comprising a horizontal ridge horizontally extending from the end of the longitudinal ridge and three cantilevers extending longitudinally from the horizontal ridge and downwards at an angle of inclination, where the two outer cantilevers having respectively disposed at their outer side one of the two wheels in the double-wheel assembly and having respectively disposed at their inner side two ends of the second pedal in the double-wheel assembly, and the middle cantilever having correspondingly disposed a central part of the second pedal.

The single-wheel assembly further comprises a wheel impact absorption mechanism for buffering the bounce of the steering wheel; and/or the double-wheel assembly further comprises two wheel impact absorption mechanisms respectively disposed in two wheels for buffering the bounce of the two wheels.

The single-wheel assembly further comprises a clutching mechanism disposed in the steering wheel for controlling whether the horizontal axis of the steering wheel and the first pedal are coupled together; and/or the double-wheel assembly further comprises two clutching mechanisms respectively disposed at the two wheels for respectively controlling whether the horizontal axes of the two wheels and the second pedal are coupled together.

The first handlebar mounting base comprises: a vertically-disposed tube, a body of steering mechanism that is disposed in the tube, and a first transmission interface mechanism coordinating with the body of steering mechanism, the body of steering mechanism being coupled to the single-wheel assembly, and directly coordinating with the handlebar assembly to form a steering assembly in a first riding mode.

The second handlebar mounting base comprising: a vertically-disposed tube, a second transmission interface mechanism disposed in the tube, where the body of steering mechanism coordinating with the handlebar assembly through the first transmission interface mechanism, the transmission mechanism and the second transmission interface mechanism so as to form a steering assembly in a second riding mode.

The steering assembly comprises: two discontinuous recessed members, each recessed member being an arch having two ends and distributing along the circumference of the tube; a guidance member which may be configured to rotate in the two recessed members, where the rotation is limited by the two ends of each recessed member; a supporting structure for supporting the tube; a pressure transmission member non-rotatably fixed on the supporting structure and coupled to the guidance member that may push the guidance member into one of the two recessed members, where the pressure transmission member being configured to quit the guidance member from one of the two recessed members in response to a pressure.

The tricycle further comprises a housing detachably disposed on the frame.

Compared with the prior art, the tricycle of the present invention may easily switch between two riding modes and may increase the fun of riding.

BRIEF DESCRIPTION OF THE DRAWINGS

In order to understand the invention and to see how it may be carried out in practice, embodiments will now be described, by way of non-limiting example only, with reference to the accompanying drawings, in which.

The reference numerals are listed as follows: 1: frame; 11: first saddle mounting base; 12: second saddle mounting base; 13: longitudinal ridge; 14: mounting frame; 2: single-wheel assembly; 21: steering wheel; 22: first pedal; 3: first handlebar mounting base; 31: tube; 32: body of steering mechanism; 33: first transmission interface mechanism; 4: double-wheel assembly; 41: wheel; 42: second pedal; 5: second handlebar mounting base; 51: tube; 52: second transmission interface mechanism; 6: handlebar assembly; 7: transmission mechanism; 8: saddle; 9: housing.

DETAILED DESCRIPTION OF EMBODIMENTS

In the following description, the present utility model is further described in detail with reference to accompanying drawings.

Figure 1:
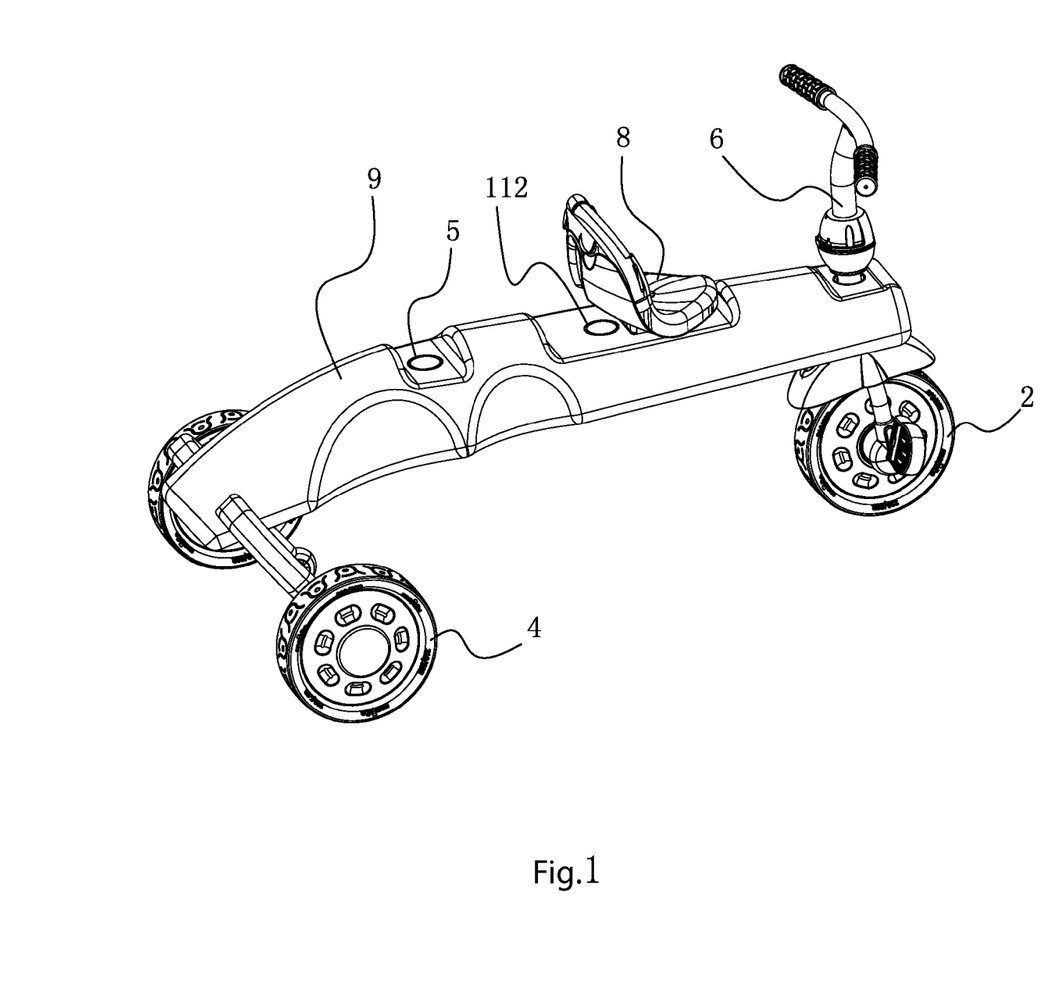
FIG. 1 is a perspective view of the tricycle of the present invention in a first riding mode.
Figure 2:
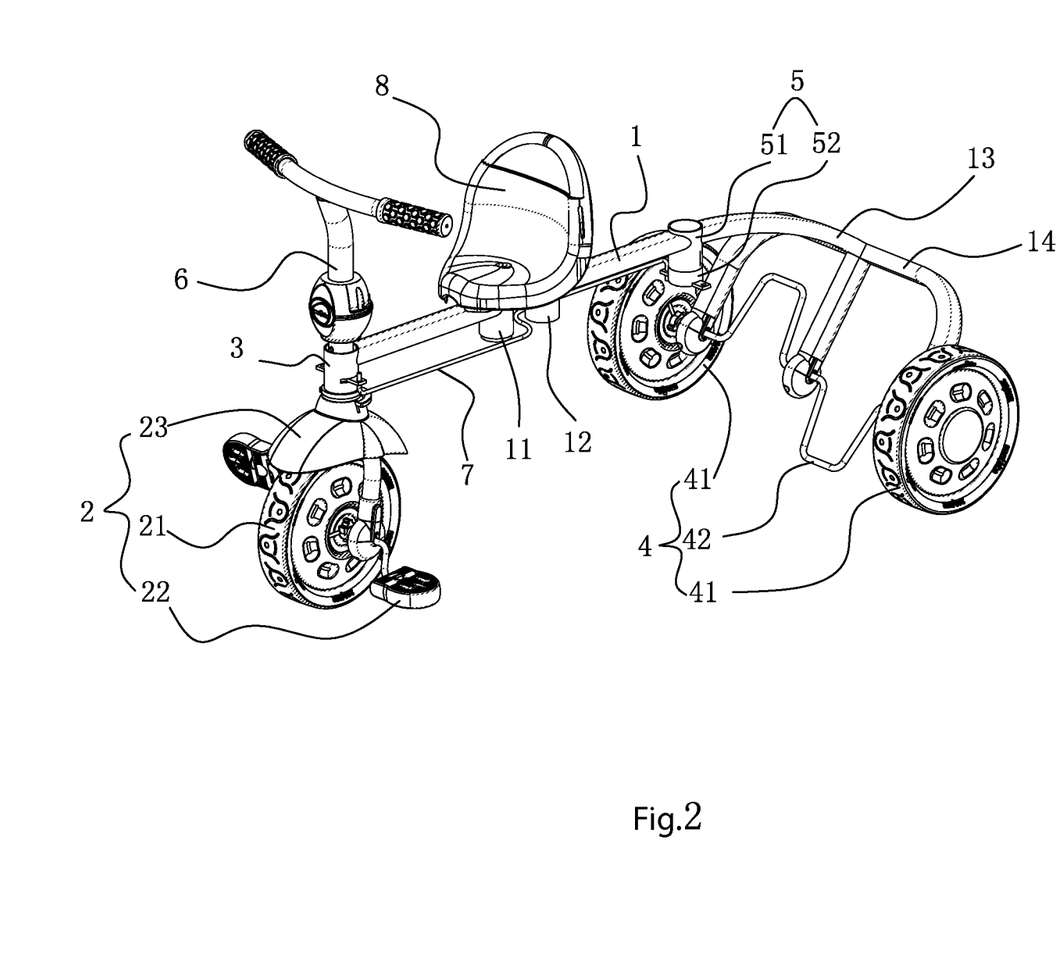
FIG. 2 and FIG. 3 are perspective views of the tricycle in a first riding mode from two different perspectives according to the present invention.
Figure 3:
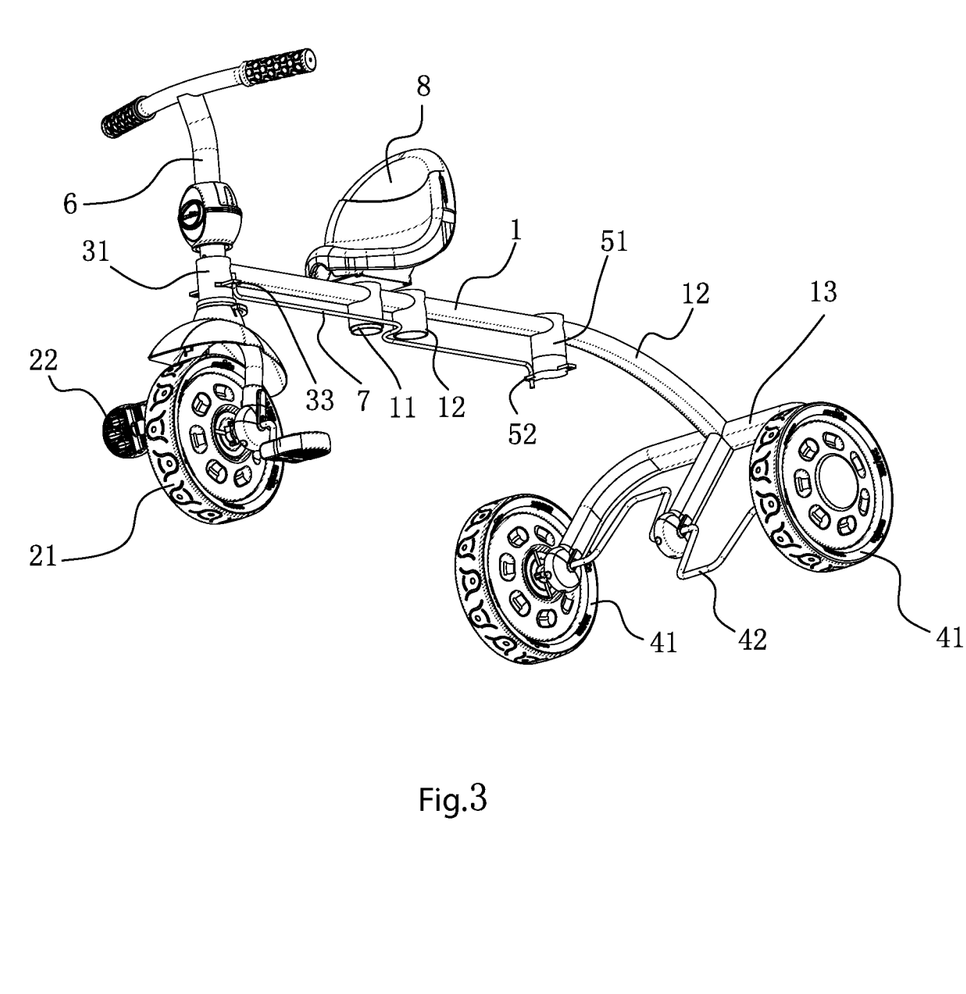

With reference to FIGS. 1, 2, and 3, the tricycle of the present invention is in a first riding mode. The tricycle generally comprises: a frame 1, a single-wheel assembly 2 and a first handlebar mounting base 3 that are disposed at one longitudinal end of the frame, a double-wheel assembly 4 and a second handlebar mounting base 5 that are disposed at the other end of the frame along its longitude, a transmission mechanism 7 disposed between the second handlebar mounting base 5 and the first handlebar mounting base 3, and a handlebar assembly 6 disposed on the first handlebar mounting base 3. The single-wheel assembly 2 comprises a steering wheel 21 and a first pedal 22 for driving the steering wheel 21 to roll. The double-wheel assembly 4 comprises two wheels 41 widthwise spaced apart, and a second pedal 42 for driving the two wheels 41 to roll.

The tricycle further comprises a housing 9 detachably disposed on the frame 1. The tricycle may have a variety of different appearances by changing the shape or color of the housing 9.

The tricycle further comprises a saddle 8. The frame 1 has disposed thereon a first saddle mounting base 11 and a second saddle mounting base 12. In the first riding mode, the saddle 8 is disposed on the first saddle mounting base 11.

More specifically, the frame 1 comprises, at its end where the double-wheel assembly 4 and the second handlebar mounting base 5 are disposed, a longitudinal ridge 13 which extends longitudinally and downwards at an angle of inclination and a mounting frame 14 which extends from the end of the longitudinal ridge 13 and downwards at an angle of inclination. The mounting frame 14 is in the shape of "E" and comprises a horizontal ridge extending horizontally from the end of the longitudinal ridge and three cantilevers extending longitudinally from the horizontal ridge and downwards at an angle of inclination, where the two outer cantilevers have been respectively disposed at their outer sides with one of the two wheels 41 in the double-wheel assembly 4 and have been respectively disposed at their inner sides with two ends of the second pedal 42 in the double-wheel assembly 4, and the middle cantilever has been correspondingly disposed with a central part of the second pedal 42.

The single-wheel assembly 2 further comprises a wheel impact absorption mechanism for buffering the bounce of the steering wheel 21. The single-wheel assembly 2 further comprises a clutching mechanism disposed in the steering wheel 21 for controlling whether the horizontal axis of the steering wheel 21 and the first pedal 22 are coupled together.

The double-wheel assembly 4 further comprises two wheel impact absorption mechanisms respectively disposed in two wheels 41 for buffering the bounce of the two wheels 41. The double-wheel assembly 4 further comprises two clutching mechanisms respectively disposed at the two wheels 41 for respectively controlling whether the horizontal axes of the two wheels 41 and the second pedal 42 are coupled together.

The wheel impact absorption mechanism may be implemented by disposing a coupling member above the horizontal axis of the wheel, a spring contacting against and located above the coupling member, and a groove located below the coupling member and having a cylindrical surface matching with the horizontal axis of the wheel.

There are a variety of implementations of the clutching mechanism, which are not herein described in detail for sake of brevity.

In a first riding mode, the clutching mechanism in the single-wheel assembly 2 shall be operated to connect the horizontal axis of the steering wheel 21 and the first pedal 22, since a first pedal 22 is needed to drive the steering wheel 21 to roll while the double-wheel assembly 4 is in a passive status. Further, for the sake of safety, the two clutching mechanisms in the double-wheel assembly 4 may be operated so as to detach the horizontal axis of the two wheels 41 from the second pedal 42 so that the rolling of the two wheels 41 would not bring along the rotation of the second pedal 42.

The first handlebar mounting base 3 comprises: a vertically-disposed tube 31, a body of steering mechanism 32 disposed in the tube 31, and a first transmission interface mechanism 33 coordinating with the body of steering mechanism 32. The body of steering mechanism 32 is coupled to the single-wheel assembly 2. The body of steering mechanism 32 directly coordinates with the handlebar assembly 6 to form a steering assembly in a first riding mode.

Figure 7:
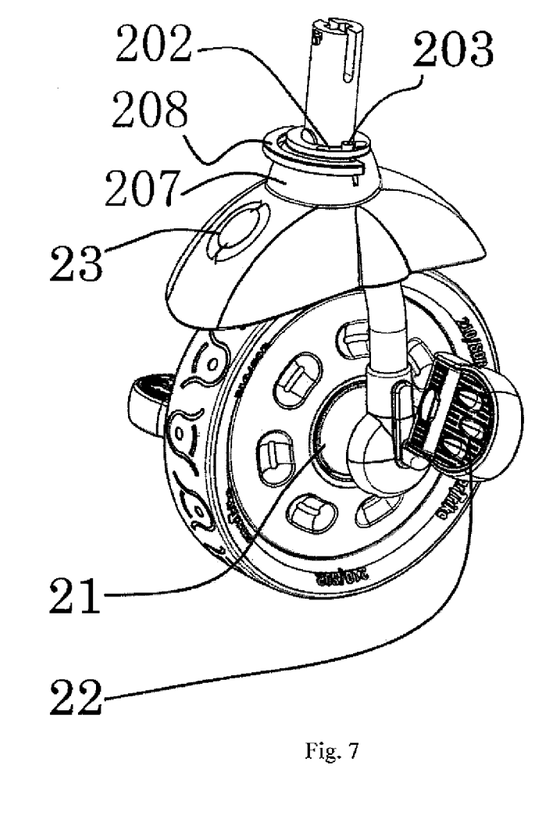
FIG. 7 is a perspective view of the single-wheel assembly of the present invention.

One implementation of the steering assembly comprises: disposing two discontinuous recessed members (such as discontinuous recessed member 202 at FIG. 7), each recessed member being an arch having two ends and distributing along the circumference of the tube 31; disposing a guidance member 203 which may be configured to rotate in the two recessed members, where the rotation is limited by the two ends of each recessed member; disposing a supporting structure 207 for supporting the tube 31; and disposing a pressure transmission member 208 non-rotatably fixed on the supporting structure 207 and coupled to the guidance member 203, the pressure transmission member 208 pushing the guidance member 203 into one of the two recessed members, where the pressure transmission member 208 may be configured to quit the guidance member 203 from one of the two recessed members in response to a pressure. The recessed members may be disposed in the tube 31, while the guidance member 203, the supporting structure 207, and the pressure transmission member 208 may be disposed in the body of steering mechanism 32. With such a structure, the radian of the recessed member may limit the rotation angle of the handlebar assembly 6 since the radian of the accessed member may limit the rotation angle of the guidance member and the guidance member may move simultaneously with the handlebar assembly 6. Accordingly, it is ensured that the rotation of handlebar assembly 6 may bring along the steering of steering wheel 21, while the rider is protected from being hit by the rotation of the handlebar assembly 6.

Figure 4:
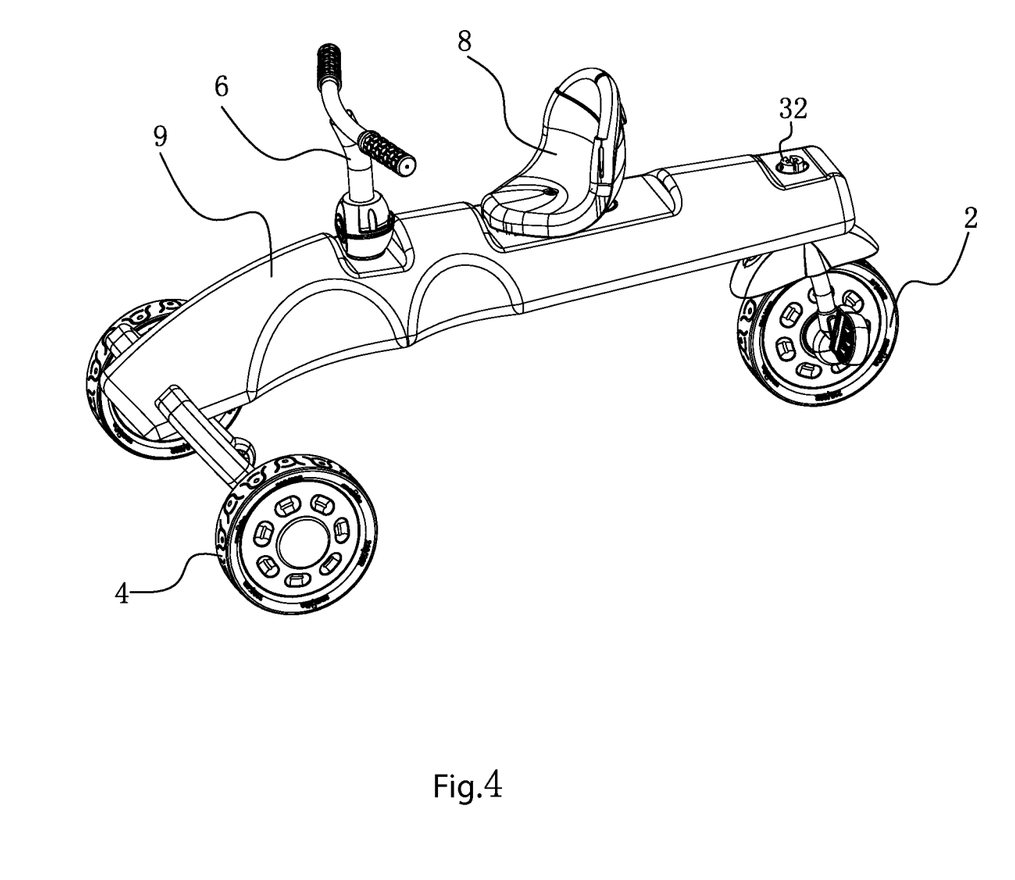
FIG. 4 is a perspective view of the tricycle of the present invention in a second riding mode.
Figure 5:
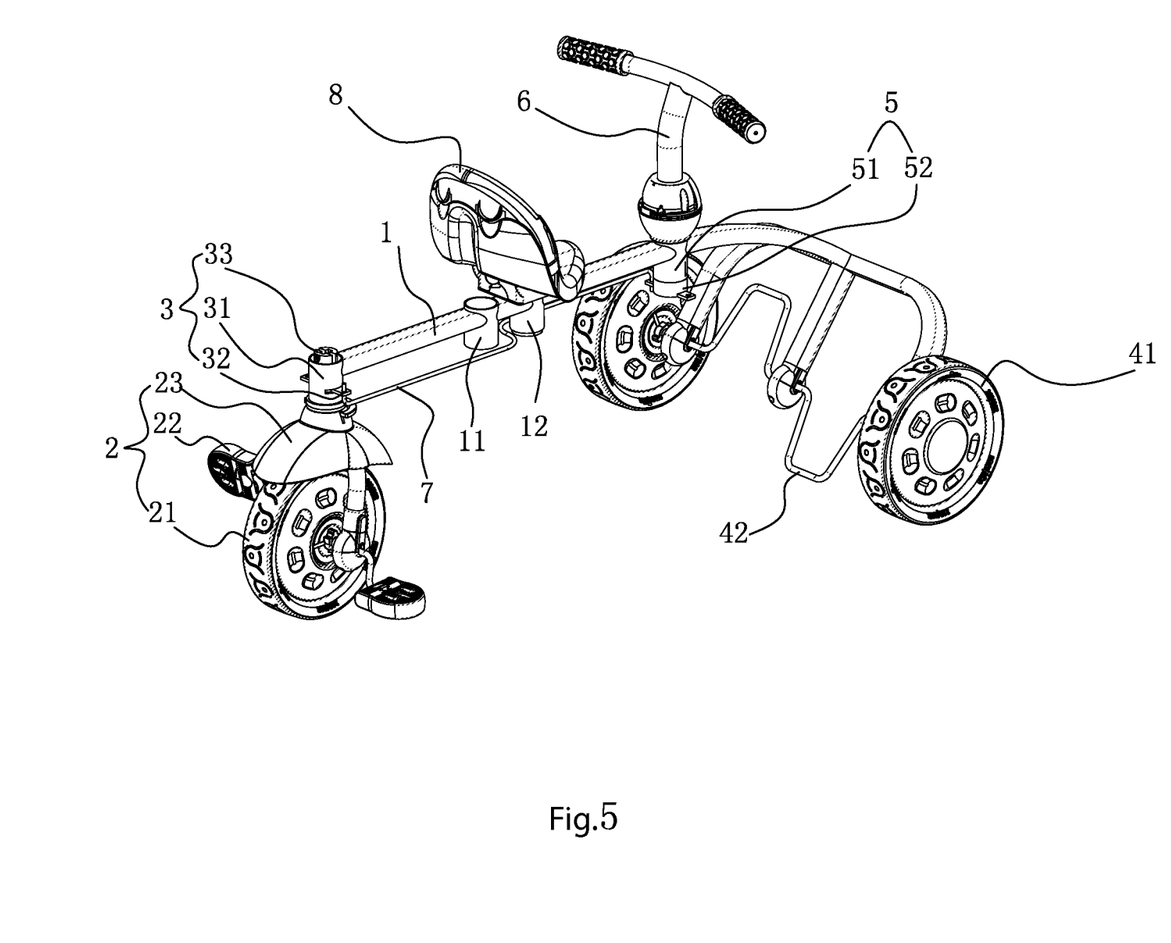
FIG. 5 and FIG. 6 are perspective views of the tricycle in a second riding mode from two different perspectives according to the present invention.
Figure 6:
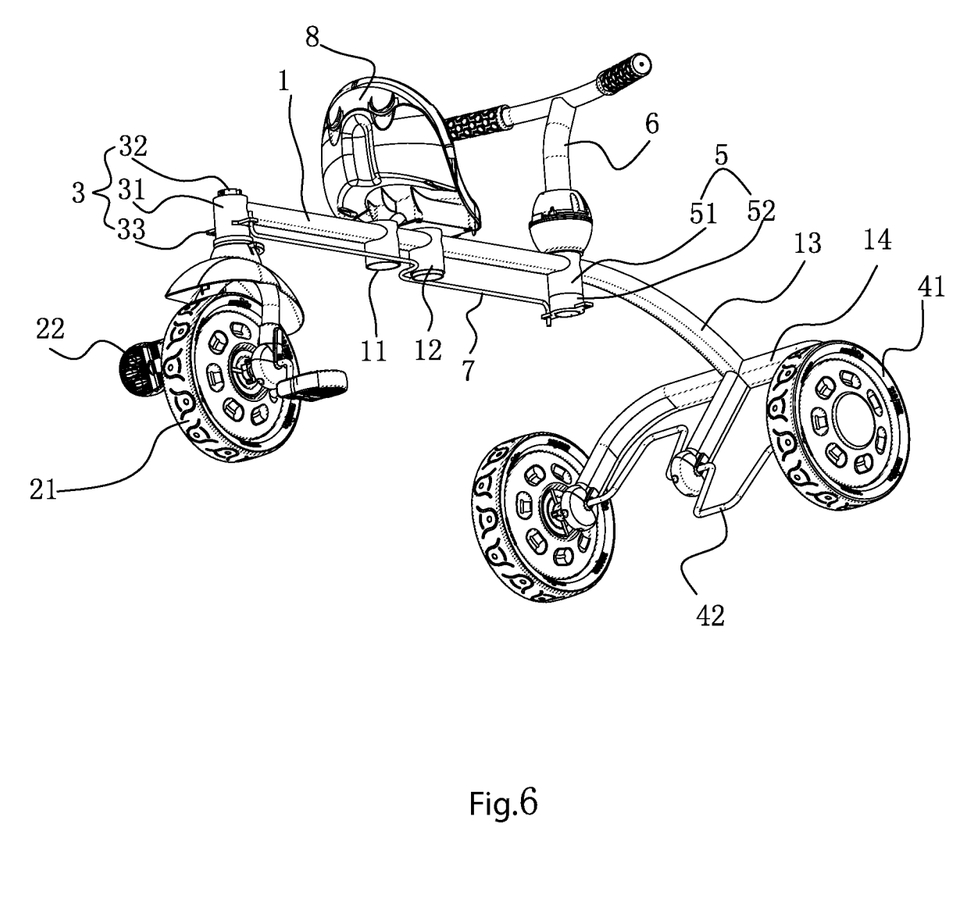

With reference to FIGS. 4, 5, and 6, the tricycle of the present invention is in a second riding mode. The tricycle in the second riding mode differs from that in the first riding mode mainly in that: the handlebar assembly 6 is disposed on the second handlebar mounting base 5 rather than on the first handlebar mounting base 3 as illustrated in the first riding mode. The saddle 8 is disposed on the second saddle mounting base 12.

In the second riding mode, the two clutching mechanisms in the double-wheel assembly 4 shall be operated to couple the horizontal axis of the two wheels 41 with the second pedal 42, since a second pedal 42 is needed to drive the two wheels 41 to roll while the steering wheel 21 is in a passive status. Further, for the sake of safety, the clutching mechanism in the single-wheel assembly 2 may be operated so as to detach the horizontal axis of the steering wheel 21 from the first pedal 22 so that the rolling of the steering wheel 21 would not bring along the rotation of the first pedal 22.

The second handlebar mounting base 5 comprises: a vertically-disposed tube 51, a second transmission interface mechanism 52 disposed in the tube 51, where the handlebar assembly 6 may coordinate with the body of steering mechanism 32 through the second transmission interface mechanism 52, the transmission mechanism 7, and the first transmission interface mechanism 33 so as to form a steering assembly in a second riding mode. The steering assembly in the second riding mode is similar to the steering assembly in the first riding mode in their structures and operation principals, except that the tube 31 in the first riding mode is substituted with the tube 51. The structures and operation principals are not herein described in detail for sake of brevity.

It is to be noted that, in the present embodiment, the first saddle mounting base 11 is, compared with the second saddle mounting base 12, closer to the single-wheel assembly 2 and the first handlebar mounting base 3. In another embodiment, the second saddle mounting base 12 may be designed to be closer to the single-wheel assembly 2 and the first handlebar mounting base 3 compared with the first saddle mounting base 11. In other embodiments, only one saddle mounting base may be disposed, where the orientations of the saddle 8 may be adjusted by spinning around for the two riding modes. Further, the saddle 8 may be designed without backrest so that the orientation of the saddle does not need to be adjusted to be suitable for the two riding modes.

Besides, in the second riding mode, the structure of the longitudinal ridge 13 and the mounting frame 14 have the function of protection since the structure is in front of riding while the second pedal is disposed behind the structure. In other words, the safety of the rider is effectively ensured when facing the impact from external objects.

Compared with the prior art, the tricycle of the present invention with two riding modes have been disposed on the frame 1 with a first handlebar mounting base 3 and a second handlebar mounting base 5, and may easily switch between a first riding mode and a second riding mode by simply changing the mounting position of the handlebar assembly 6. The first riding mode with single front wheel and double rear wheels may be implemented by mounting the handlebar assembly 6 on the first handlebar mounting base 3, so that the rider may enjoy the fun of a common tricycle by controlling the handlebar assembly 6 and the first pedal 22. The second riding mode with two front wheels and single rear wheel may be implemented by simply mounting the handlebar assembly 6 on the second handlebar mounting base 3, so that the rider may enjoy the fun of an inverted-type tricycle by controlling the handlebar assembly 6 and the second pedal 42.

The above descriptions are merely preferred embodiments of the present invention, and are not intended to limit the implementations of the present invention. According to the primary concept and spirit of the present invention, those skilled in the art may readily alter or modify these embodiments. The scope of protection of the present invention is limited by the claims.

The invention claimed is:

1. A tricycle having a riding mode with double front wheels and a single rear wheel comprising:
   a frame;
   a single-wheel assembly at one longitudinal end of said frame wherein said single-wheel assembly comprises a steering wheel;
   a double-wheel assembly disposed at the other longitudinal end of said frame wherein said double-wheel assembly, comprises two wheels widthwise spaced apart, and a pedal for rolling said two wheels, wherein said frame comprises a longitudinal ridge which extends longitudinally and downwards at a first angle of inclination and a mounting frame which extends from the end of the longitudinal ridge and downwards at a second angle of inclination, comprising a horizontal ridge extending horizontally from the end of said longitudinal ridge and at least two cantilevers extending longitudinally from the horizontal ridge and downwards at a third angle of inclination, where said two cantilevers having been respectively disposed at their outer side with one of the two wheels in said double-wheel assembly and having been respectively disposed at their inner side with two ends of the pedal in said double-wheel assembly;
   a handlebar mounting base having a vertically-disposed tube;
   a handlebar assembly disposed on said handlebar mounting base; and
   a transmission mechanism disposed between said handlebar mounting base and said single-wheel assembly; where said transmission mechanism coordinates between said steering wheel and said handlebar assembly, for forming a steering assembly and to ensure that the rotation of said handlebar assembly brings along the steering of steering wheel.

2. The tricycle of claim 1, further comprising a saddle, said frame having disposed thereon a saddle mounting base.

3. The tricycle of claim 1, wherein the single-wheel assembly further comprises a wheel impact absorption mechanism disposed in the steering wheel for buffering the bounce of the steering wheel;

which is implemented by disposing a coupling member above the horizontal axis of the wheel, a spring contacting against and located above the coupling member, and a groove located below the coupling member and having a cylindrical surface matching with the horizontal axis of the wheel.

4. The tricycle of claim 1, wherein the double-wheel assembly further comprises two clutching mechanisms respectively disposed at the two wheels, of the double-wheel assembly, for respectively controlling whether a horizontal axes of said two wheels and the pedal are coupled together where said two clutching mechanisms are operated so as to detach said horizontal axes of said two wheels from said pedal so that the rolling of said two wheels would not bring along the rotation of said pedal.

5. The tricycle of claim 1, wherein the tricycle further comprises a housing detachably disposed on the frame.

6. A tricycle having a riding mode with double front wheels and a single rear wheel comprising:
- a frame;
- a single-wheel assembly at one longitudinal end of said frame wherein said single-wheel assembly comprises a steering wheel;
- a double-wheel assembly disposed at the other longitudinal end of said frame wherein said double-wheel assembly, comprises two wheels widthwise spaced apart, and a pedal for rolling said two wheels;
- a handlebar mounting base having a vertically-disposed tube;
- a handlebar assembly disposed on said handlebar mounting base, where the handlebar mounting base comprises a vertically-disposed tube and where the body of steering mechanism is disposed in the tube; and
- a transmission mechanism disposed between said handlebar mounting base and said single-wheel assembly; where said transmission mechanism coordinates between said steering wheel and said handlebar assembly, for forming a steering assembly and to ensure that the rotation of said handlebar assembly brings along the steering of steering wheel, wherein the steering assembly comprises:

two discontinuous recessed members, each recessed member being an arch having two ends and distributing along circumference of said tube;

a guidance member which is configured to be rotatable in the two recessed members, where the rotation is limited by the two ends of each recessed member;

a supporting structure for supporting said tube; a pressure transmission member which is non-rotatably fixed on the supporting structure and coupled to the guidance member so as to push the guidance member into one of the two recessed members.

\* \* \* \* \*